(12) United States Patent
Miyasato et al.

(10) Patent No.: US 8,857,583 B2
(45) Date of Patent: Oct. 14, 2014

(54) HYDRAULIC SHOCK ABSORBER

(75) Inventors: Eiko Miyasato, Tsukubamirai (JP); Akira Hiroki, Tsukubamirai (JP); Junya Kaneko, Tsukubamirai (JP); Youji Takakuwa, Tsukubamirai (JP); Kengo Monden, Tsukubamirai (JP); Masayuki Ishikawa, Tsukubamirai (JP); Mariko Kessoku, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 150 days.

(21) Appl. No.: 13/521,631

(22) PCT Filed: Dec. 1, 2010

(86) PCT No.: PCT/JP2010/071456
§ 371 (c)(1), (2), (4) Date: Aug. 20, 2012

(87) PCT Pub. No.: WO2011/086780
PCT Pub. Date: Jul. 21, 2011

(65) Prior Publication Data
US 2013/0015027 A1     Jan. 17, 2013

(30) Foreign Application Priority Data
Jan. 14, 2010   (JP) ................................. 2010-006026

(51) Int. Cl.
F16F 9/10     (2006.01)
F16F 9/36     (2006.01)

(52) U.S. Cl.
CPC ..................................... F16F 9/363 (2013.01)
USPC ........................ 188/322.17; 267/33; 267/286

(58) Field of Classification Search
USPC ................... 188/322.16–322.18; 267/33, 286
See application file for complete search history.

(56) References Cited

U.S. PATENT DOCUMENTS

| | | | |
|---|---|---|---|
| 3,621,949 A * | 11/1971 | Watson | 188/284 |
| 4,185,721 A * | 1/1980 | Karklins et al. | 188/322.17 |
| 4,493,490 A * | 1/1985 | Ohma | 280/276 |
| 8,205,729 B2 * | 6/2012 | Miyasato et al. | 188/286 |
| 2009/0001636 A1 * | 1/2009 | Miyasato et al. | 267/64.13 |
| 2009/0223762 A1 | 9/2009 | Horikawa et al. | |
| 2012/0247891 A1 * | 10/2012 | Miyasato et al. | 188/288 |

FOREIGN PATENT DOCUMENTS

| | | |
|---|---|---|
| JP | 58 95385 | 6/1983 |
| JP | 2 24136 | 2/1990 |
| JP | 2004 11786 | 1/2004 |
| JP | 2006 250309 | 9/2006 |

OTHER PUBLICATIONS

International Search Report Issued Feb. 8, 2011 in PCT/JP10/71456 Filed Dec. 1, 2010.

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

A hydraulic shock absorber that can reduce outflow amount of oil by maximally removing an oil film attached to an outer periphery of a rod and that can achieve securement of high slidability between the rod and a rod packing and prevention of wear of the rod packing. A rod packing interposed between an outer periphery of a rod and an inner periphery of a rod-side end wall includes a first lip for scrapping off an oil film attached to the outer periphery of the rod, and a ring-shaped grease holding member for supplying holding grease to the outer periphery of the rod. The grease holding member is in contact with the outer periphery of the rod at a position closer to a rod distal end than the first lip.

3 Claims, 3 Drawing Sheets

HYDRAULIC SHOCK ABSORBER

TECHNICAL FIELD

The present invention relates to a hydraulic shock absorber that absorbs a shock caused by stopping a moving object, by utilizing the flow resistance of oil.

BACKGROUND ART

As described, for example, in Patent Literature 1, in a hydraulic shock absorber, a piston chamber in a cylinder housing is filled with oil such as mineral oil, a piston for braking is stored in the piston chamber while an oil circulation gap is held on an outer periphery of the piston, and a rod connected to the piston slidably extends outside through a rod-side end wall (sleeve) of the cylinder housing. When a moving object collides with a distal end of the rod to move the piston, kinetic energy of the moving object is absorbed by flow resistance of oil flowing in the circulation gap.

The rod is normally located at an initial position at a forward end by biasing force of a return spring, and repeats an operation of moving backward to absorb shock when the moving object collides with the rod and then returning to the initial position again because of the biasing force of the return spring. At this time, the oil filled in the piston chamber is attached to a surface of the rod to form an oil film. Hence, when the rod repeats forward and backward movements, the oil in the piston chamber flows outside little by little via the rod. As a result, the oil amount in the piston chamber gradually decreases. Thus, in general, the shock absorbing ability of the shock absorber declines, and the shock absorber comes to the end of its life.

To prevent such decline in the shock absorbing ability due to the decrease in oil amount, the outflow amount is reduced by scraping off the oil film attached to the outer periphery of the rod with a scraper provided between an outer periphery of the rod and an inner periphery of the rod-side end wall and returning the oil film into the piston chamber.

However, on the other hand, the oil film functions as a lubricant oil for a slide between a rod packing provided in the rod-side end wall and the rod. Hence, if the oil film is removed more than necessary, the slide resistance of the rod increases, and the sliding property decreases. Also, the rod packing wears, and sealability decreases.

For this reason, a structure needs to be such that a required amount of oil flows out as lubricant oil, and there is a limit to reduction of the outflow amount of oil. This is the most serious obstruction to prevention of decline in the shock absorbing ability of the shock absorber resulting from the decrease in oil amount.

PRIOR ART DOCUMENT

Patent Literature

Patent Literature 1: Japanese Unexamined Patent Application Publication No. 2006-250309

SUMMARY OF INVENTION

Technical Problem

An object of the present invention is to reduce the outflow amount of oil by maximally removing an oil film attached to an outer periphery of a rod in a hydraulic shock absorber and to achieve securement of high slidability between the rod and a rod packing and prevention of wear of the rod packing.

Solution to Problem

To achieve the above object, in a hydraulic shock absorber of the present invention, a piston chamber filled with oil is provided in a cylinder housing including a head-side end wall and a rod-side end wall. A piston for shock absorption is stored in the piston chamber to be movable in an axial direction of the piston chamber. A proximal end of a rod is connected to the piston, and a distal end of the rod extends out of the cylinder housing through the rod-side end wall. A rod packing is interposed between an outer periphery of the rod and an inner periphery of the rod-side end wall, and the rod packing includes a first lip having an edge for scraping off an oil film attached to the outer periphery of the rod, and a ring-shaped grease holding member holding grease to be supplied to the outer periphery of the rod. The grease holding member is in contact with the outer periphery of the rod at a position closer to the distal end of the rod than the first lip.

In the present invention, preferably, the rod packing includes a second lip for sealing at a position closer to the distal end of the rod than the first lip, and the grease holding member is interposed between the first lip and the second lip. In the present invention, preferably, a ring-shaped recessed groove is provided in an inner periphery of the rod packing, and the grease holding member is fitted in the recessed groove.

Further, in the present invention, a sleeve surrounding the rod with a small slide gap therebetween may extend from the rod-side end wall toward the piston chamber, and the rod may have, in a portion located in the slide gap between the outer periphery of the rod and the inner peripheries of the rod-side end wall and the sleeve, a labyrinth that reduces pressure acting on the rod packing via the oil in the slide gap.

In this case, preferably, the labyrinth includes a plurality of peripheral grooves surrounding the outer periphery of the rod, and the peripheral grooves are filled with a high-viscosity oil having a viscosity higher than a viscosity of the oil.

Advantageous Effects of Invention

According to the present invention, even if the oil film on the outer periphery of the rod is maximally scraped off by the first lip of the rod packing, grease supplied from the grease holding member provided in the rod packing properly maintains high slidability between the rod packing and the rod and prevents wear of the rod packing. As a result, the life of the shock absorber can be lengthened by maximally reducing the outflow amount of oil. Also, high slidability between the rod and the rod packing can be maintained, and durability of the rod packing can be enhanced.

DESCRIPTION OF EMBODIMENTS

Figure 1:
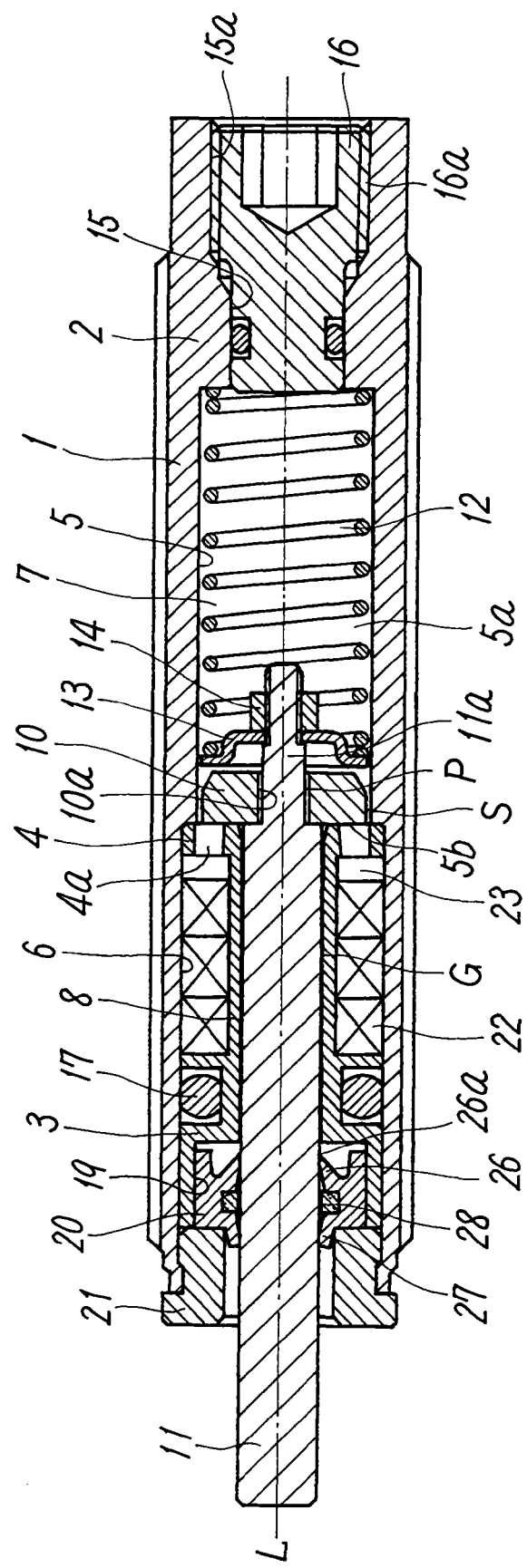
FIG. 1 is a cross-sectional view of a first embodiment of a hydraulic shock absorber according to the present invention, illustrating a state in which a piston and a rod are located at an initial position.
Figure 2:
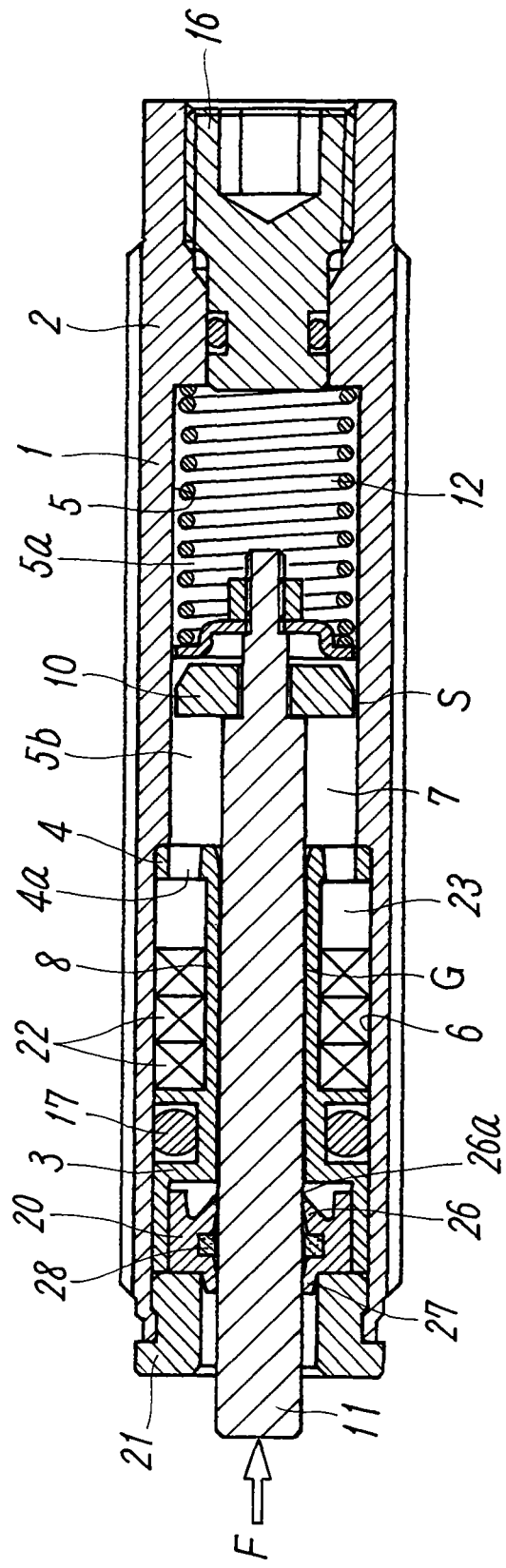
FIG. 2 is a cross-sectional view illustrating a different operating state of the shock absorber of FIG. 1, in which the piston and the rod are moved to a shock absorbing position.
Figure 3:
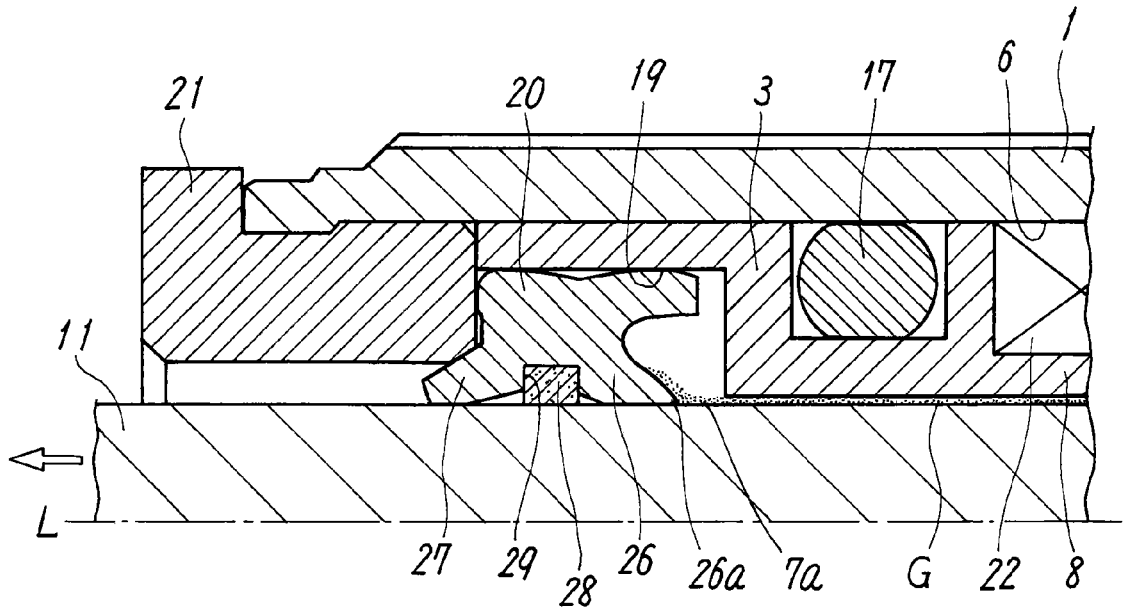
FIG. 3 is an enlarged view of the principal part of FIG. 1.

FIGS. 1 to 3 illustrate a first embodiment of a hydraulic shock absorber according to the present invention. This shock absorber includes a cylindrical cylinder housing 1. The cylinder housing 1 includes a head-side end wall 2 provided at a proximal end side in a direction of an axis L, a rod-side end wall 3 provided at a distal end side in the direction of the axis L, and an intermediate wall 4 provided at an intermediate position therebetween. A piston chamber 5 is provided between the intermediate wall 4 and the head-side end wall 2, and an accumulator chamber 6 is provided between the intermediate wall 4 and the rod-side end wall 3. The piston chamber 5 and the accumulator chamber 6 are filled with oil 7 in a pressurized state. The piston chamber 5 and the accumulator chamber 6 communicate with each other via a communication hole 4a of the intermediate wall 4.

In the piston chamber 5, a shock-absorbing piston 10 having an outer diameter smaller than an inner diameter of the piston chamber 5 is stored to be movable along the axis L of the cylinder housing 1 (piston chamber 5) in a state in which a gap S where the oil 7 circulates is held between an outer periphery of the piston 10 and an inner periphery of the cylinder housing 1, and a proximal end of a rod 11 is connected to the piston 10. To the proximal end of the rod 11, a spring seat plate 13 is attached by a nut 14. Between the spring seat plate 13 and the head-side end wall 2, a return spring 12 is provided to constantly bias the piston 10 toward an initial position (a position of FIG. 1) in contact with the intermediate wall 4.

The piston 10 is mounted on the rod 11 in a floating state by fitting a thinned mounting portion 11a at the proximal end of the rod 11 in a mounting hole 10a that extends through the center of the piston 10, and is locked by the spring base plate 13, so that the piston 10 is prevented from falling off the rod 11.

In contrast, a distal end of the rod 11 slidably extends out of the cylinder housing 1 through the intermediate wall 4, a sleeve 8, and the rod-side end wall 3.

When a moving object to be braked collides with the distal end of the rod 11 at the initial position of FIG. 1 and a shock force F in a push direction acts on the rod 11, the piston 10 pushed by the rod 11 moves in the piston chamber 5 to a shock absorbing position of FIG. 2. With this, the oil 7 in a head-side compartment 5a provided between the piston 10 and the head-side end wall 2 moves into a rod-side compartment 5b provided between the piston 10 and the intermediate wall 4 through the gap S. By the flow resistance of the oil 7 provided at this time, kinetic energy of the moving object is absorbed, and shock absorption is performed.

When the acting force of the moving object is removed, the piston 10 and the rod 11 are moved forward and returned to the initial position of FIG. 1 by the biasing force of the return spring 12. At this time, the oil 7 in the rod-side compartment 5b moves into the head-side compartment 5a through the gap S. At the same time, the oil 7 in the rod-side compartment 5b may move into the head-side compartment 5a through a gap P provided between the rod 11 and the piston 10.

The cylinder housing 1 and the head-side end wall 2 are provided integrally. An injection hole 15 is provided in the center of the head-side end wall 2 so that the oil 7 is filled in the cylinder housing 1 therethrough. The injection hole 15 is closed by a plug 16 that also functions as a pressure control member for applying preload to the filled oil 7. The plug 16 is mounted in the injection hole 15 with an external thread portion 16a at its proximal end being screwed in an internal thread portion 15a of the injection hole 15. By rotating and moving the plug 16 forward, the oil 7 in the cylinder housing 1 can be pressurized.

The rod-side end wall 3 is provided separately from the cylinder housing 1, and is fitted in the cylinder housing 1 with an O-ring 17 being disposed therebetween. The rod-side end wall 3 is integrally provided with the cylindrical sleeve 8 that surrounds the outer periphery of the rod 11 and extends toward the head-side end wall 2. As illustrated in FIG. 3, a small slide gap G is provided between the inner peripheries of the rod-side end wall 3 and the sleeve 8 and the outer periphery of the rod 11.

In a recessed step portion 19 provided in an inner periphery of the rod-side end wall 3, a ring-shaped rod packing 20 is mounted to seal between the inner periphery of the rod-side end wall 3 and the outer periphery of the rod 11. The rod-side end wall 3 and the rod packing 20 are fixed at a mounting position by an annular fixing member 21 attached to an end of the cylinder housing 1.

As illustrated in FIGS. 1 and 2, the sleeve 8 extends long along the axis L of the cylinder housing 1, and also functions as a bearing and a guide for the rod 11. Thus, even if uneven load acts on the rod 11, the rod 11 can be moved forward and backward in proper directions. Hence, the movement of the piston 10 is prevented from being hindered by contact with a wall surface of the piston chamber 5, and this allows stable shock absorption.

While the intermediate wall 4 is provided integrally with a distal end of the sleeve 8, it may be provided separately from the sleeve 8 and may be joined to the sleeve 8. Alternatively, the intermediate wall 4 can be provided integrally with the cylinder housing 1. Further alternatively, the intermediate wall 4 may be provided as an independent member and may be fitted in the cylinder housing 1 while being in contact with the distal end of the sleeve 8.

The accumulator chamber 6 is a cylindrical chamber that surrounds the sleeve 8. Both ends of the accumulator chamber 6 in the direction of the axis L are defined by the rod-side end wall 3 and the intermediate wall 4. The outer diameter of the accumulator chamber 6 is larger than the inner diameter of the piston chamber 5.

In the accumulator chamber 6, a ring-shaped elastic member 22, which expands and contracts according to the change in inner capacity due to forward and backward movement of the rod 11, is stored to expand and contract in the direction of the axis L and the radial direction of the cylinder housing 1. The elastic member 22 is formed of an expandable and contractible porous material. As the porous material, for example, a foam material of nitrile rubber (NBR) or synthetic resin having closed cells is used. The elastic member 22 is provided in the accumulator chamber 6 to surround the sleeve 8. In the initial state of FIG. 1 in which the rod 11 is at the forward end, the elastic member 22 is elastically compressed by the pressure of the pressurized oil 7. A space formed by contraction forms a reservoir tank 23 in the accumulator chamber 6.

The length in the direction of the axis L in a non-compressed state, inner diameter, and outer diameter of the elastic member 22 are preferably set to be substantially equal to, slightly less than, or slightly more than the length in the direction of the axis L, inner diameter, and outer diameter of the accumulator chamber 6. In other words, the preferred size of the elastic member 22 in the non-compressed state is a size that fills almost the entire accumulator chamber 6. At this time, the reservoir tank 23 is not formed in the accumulator chamber 6.

Since the reservoir tank 23 communicates with the piston chamber 5 through the communication hole 4a provided in the intermediate wall 4, the oil 7 sealed in the piston chamber 5 and the reservoir tank 23 is pressurized by elastic restoring force of the compressed elastic member 22.

When the piston 10 and the rod 11 start to move backward from the initial position at the forward end and move to the shock absorbing position of FIG. 2, the reservoir tank 23 receives part of the oil 7 flowing from the head-side compartment 5a to the rod-side compartment 5b, that is, an amount of oil corresponding to the volume of a portion of the rod 11 entering the rod-side compartment 5b, thereby absorbing the capacity difference between the compartments 5a and 5b. Since the inflow amount of oil differs according to the position of the piston 10, the capacity of the reservoir tank 23 changes correspondingly. More specifically, as the piston 10 is pushed in and moved to the shock absorbing position, the amount of oil 7 flowing into the reservoir tank 23 gradually increases. Hence, the compression amount of the elastic member 22 also gradually increases, and the capacity of the reservoir tank 23 increases. Conversely, when the piston 10 returns from the shock absorbing position to the initial position, the oil 7 flows out of the reservoir tank 23. Hence, the elastic member 22 expands, and the capacity of the reservoir tank 23 decreases.

While the reservoir tank 23 is formed at one end of the accumulator chamber 6 by compression of the elastic member 22 in the direction of the axis L in the illustrated embodiment, it is not always formed as in the embodiment, because the elastic member 22 is compressed by the oil 7 in both the direction of the axis L and the radial direction. The reservoir tank 23 can be formed on an inner periphery or an outer periphery of the elastic member 22.

As illustrated in FIG. 3, the rod packing 20 is a lip-shaped packing formed of a synthetic rubber material or a synthetic resin material, and is provided integrally with two sealing lips 26 and 27 in contact with the outer periphery of the rod 11. Of these, the first lip 26 is provided at a position closer to the proximal end of the rod 11 (a position closer to the piston 10) than the other second lip 27, and has an edge 26a that is pointed toward the proximal end of the rod 11. When the rod 11 returns from the shock absorbing position to the initial position, the edge 26a scrapes off an oil film 7a attached to the outer periphery of the rod 11 and returns the oil film 7a into the slide gap G. Therefore, the first lip 26 has both a sealing function and a function as a scraper for scraping off the oil film 7a.

In contrast, the second lip 27 is provided at a position closer to the distal end of the rod 11 than the first lip 26 such that a tip thereof points toward the distal end of the rod 11. By contact with the outer periphery of the rod 11 at this position, the second lip 27 seals between the rod 11 and the rod-side end wall 3.

For example, nitrile rubber or fluororubber is suitably used as the synthetic rubber material, and polyurethane resin or polytetrafluoroethylene resin is suitably used as the synthetic resin material. Preferably, the rod packing 20 is made porous and is impregnated with lubricant, such as grease, to have a self-lubricating property.

The rod packing 20 further includes a ring-shaped grease holding member 28 that holds grease. The grease holding member 28 is provided separately from the rod packing 20. To attach the grease holding member 28, a ring-shaped recessed groove 29 is provided between the first lip 26 and the second lip 27 in an inner periphery of the rod packing 20. The grease holding member 28 is fitted in the recessed groove 29, and an inner periphery of the grease holding member 28 is in contact with the outer periphery of the rod 11.

The grease holding member 28 is formed of an expandable and contractible porous material of rectangular cross section, and is impregnated with grease. The grease holding member 28 supplies the grease little by little onto an outer peripheral surface of the rod 11 during sliding between the grease holding member 28 and the rod 11, and thereby maintains the lubricating property between the rod 11 and the lips 26 and 27 of the rod packing 20.

Similarly to the above-described elastic member 22, for example, the grease holding member 28 can be formed of a foam material made of nitrile rubber or synthetic resin. The cross-sectional shape of the grease holding member 28 may be an arbitrary shape different from the rectangular shape, and for example, the cross-sectional shape can be circular, elliptical, U-shaped, or D-shaped.

The operation of the hydraulic shock absorber having the above-described configuration will be described. When the shock absorber is in a non-operation state, the piston 10 is pressed by the return spring 12 and takes the initial position in contact with the intermediate wall 4, as illustrated in FIG. 1. At this time, the reservoir tank 23 is formed by the compressed elastic member 22 in the accumulator chamber 6, and the oil 7 in the cylinder housing 1 is pressurized by the restoring force of the elastic member 22.

When the moving object collides with the rod 11 in this state, the piston 10 is pushed by the rod 11 and is moved to the shock absorbing position of FIG. 2. Then, with these movements of the piston 10 and the rod 11, the oil 7 in the head-side compartment 5a flows into the rod-side compartment 5b through the gap S on the outer periphery of the piston 10. The flow resistance at this time absorbs kinetic energy of the moving object. Further, an amount of oil corresponding to the volume of a portion of the rod 11 entering the rod-side compartment 5b, of the oil 7 flowing in the rod-side compartment 5b, flows into the reservoir tank 23, and further compresses the elastic member 22 to increase the capacity of the reservoir tank 23.

When the acting force of the moving object acting on the rod 11 is removed, the piston 10 and the rod 11 are returned to the initial position at the forward end by the biasing force of the return spring 12. At this time, the oil 7 in the reservoir tank 23 is pushed out from the reservoir tank 23 by the elastic restoring force of the elastic member 22, and flows into the head-side compartment 5a through the rod-side compartment 5b, so that the piston 10 is allowed to return. The compressed elastic member 22 restores with the flow of the oil 7 out of the reservoir tank 23, and is brought into the initial state of FIG. 1.

The oil 7, which is attached to a rod portion entering the slide gap G across the first lip 26 of the rod packing 20 when the rod 11 is moved to the shock absorbing position of FIG. 2, is maximally scrapped off by the edge 26a of the first lip 26 when the rod 11 returns from the shock absorbing position to the initial position of FIG. 1. This prevents the oil 7 from being taken out beyond the rod packing 20. Therefore, the decrease in oil amount in the piston chamber 5 is suppressed, and functional deterioration of the shock absorber resulting from the decrease in oil amount is avoided reliably.

However, since it is difficult to completely scrape off the oil film 7a on the surface of the rod 11, an extremely small amount of oil 7 can flow outside. In this case, the oil amount is slightly decreased by long-time use of the shock absorber. In this case, the discharge valve seat 16 is fastened to pressurize the oil 7 in the piston chamber 5. However, the frequency at which such an operation is performed is much lower than in the shock absorber of the related art.

In contrast, grease is supplied little by little from the grease holding member 28 onto the outer peripheral surface of the rod 11, and the grease ensures the lubricating property between the rod 11 and the first lip 26 and the second lip 27 of the rod packing 20. Therefore, there is no need to ensure the lubricating property by a part of the oil 7 in the piston chamber 5. Hence, the oil film 7a on the rod surface can be maximally scraped off by the first lip 26. Even when the oil film 7a is maximally scraped off, slidability between the rod packing 20 and the rod 11 is properly maintained by the grease, and wear of the rod packing 20 is prevented.

As a result, the functional deterioration of the shock absorber due to the decrease in oil amount can be prevented by maximally reducing the outflow amount of oil 7. Also, high slidability between the rod 11 and the rod packing 20 can be maintained, and durability of the rod packing 20 can be enhanced.

Figure 4:
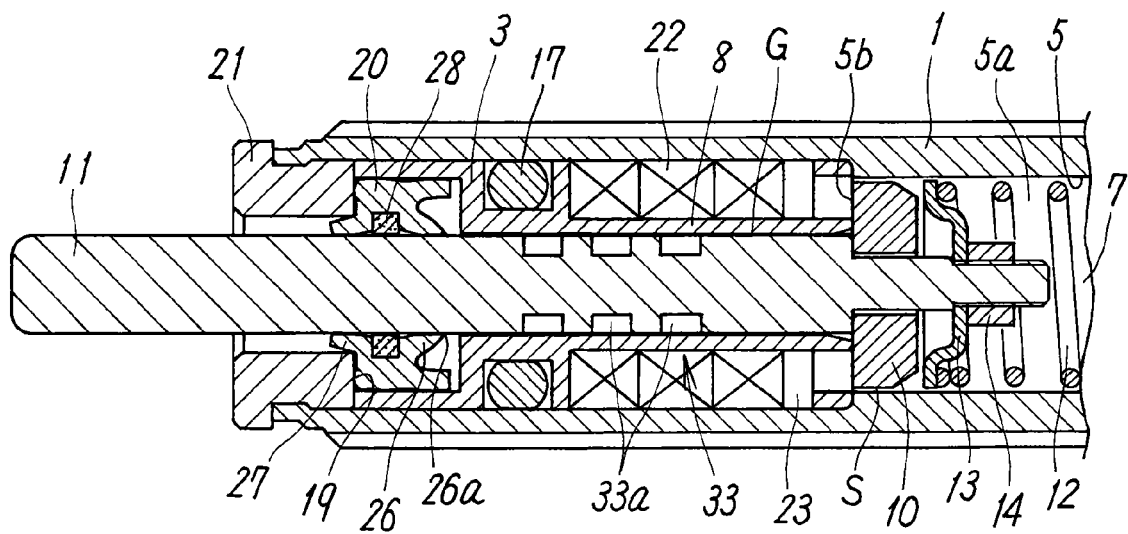
FIG. 4 is a partial cross-sectional view of a second embodiment of a hydraulic shock absorber according to the present invention.

FIG. 4 illustrates the principal part of a second embodiment of a shock absorber. This shock absorber has a configuration that is more effective in enhancing durability and sealability of a rod packing 20.

That is, this shock absorber has, on an outer periphery of a rod 11, a labyrinth 33 including a plurality of peripheral grooves 33a surrounding the rod 11. The labyrinth 33 controls the flow of oil 7 flowing in a slide gap G between the outer periphery of the rod 11 and inner peripheries of a rod-side end wall 3 and a sleeve 8, thereby preventing an excessive pressure of the oil from acting on the rod packing 20.

In general, when the piston 10 and the rod 11 return from a shock absorbing position to an initial position, oil 7 in a rod-side compartment 5b in a piston chamber 5 is pressurized by a piston 10, and flows into a reservoir tank 23. Also, the oil 7 flows through the slide gap G and acts on the rod packing 20. For this reason, a first lip 26 of the rod packing 20 is worn early by an excessive pressure from the oil 7, and deteriorates a scraping function for an oil film 7a and a sealing function.

However, when the above-described labyrinth 33 is provided in the rod 11 as in the second embodiment, the flow rate of the oil 7 flowing in the slide gap G is controlled while the oil 7 flows through the labyrinth 33. This reduces the pressure acting on the first lip 26. For this reason, wear of the first lip 26 is prevented, and durability and sealability of the rod packing 20 are enhanced.

The labyrinth 33 needs to be formed at a position in the rod 11 such that none of the peripheral grooves 33a come out of the inner peripheries of the rod-side end wall 3 and the sleeve 8 even when the rod 11 reciprocates between the initial position and the shock absorbing position, that is, a position such that all of the peripheral grooves 33a are constantly located in the slide gap G.

The peripheral grooves 33a of the labyrinth 33 can be filled with high-viscosity oil, such as grease, having a viscosity higher than that of the oil 7. This further increases the effect of reducing the flow rate (pressure) of the oil 7 in the slide gap G.

The high-viscosity oil may be filled in the labyrinth by impregnating an expandable and contractible porous material, such as the grease holding member 28, with the high-viscosity oil and placing the porous material in the peripheral grooves 33a.

Since structures other than the above-described structures of the second embodiment are the same as those adopted in the first embodiment, the same constituent parts as in the first embodiment are denoted by the same reference numerals, and descriptions thereof are skipped.

Reference Signs List
    1: cylinder housing
    2: head-side end wall
    3: rod-side end wall
    5: piston chamber
    7: oil
    7a: oil film
    8: sleeve
    10: piston
    11: rod
    20: rod packing
    26: first lip
    26a: edge
    27: second lip
    28: grease holding member
    29: recessed groove
    33: labyrinth
    33a: peripheral groove
    L: axis
    G: slide gap

The invention claimed is:

1. A hydraulic shock absorber comprising:
a piston chamber filled with oil provided in a cylinder housing including a head-side end wall and a rod-side end wall;
a piston for shock absorption stored in the piston chamber to be movable in an axial direction of the piston chamber, a proximal end of a rod is connected to the piston, a distal end of the rod extends out of the cylinder housing through the rod-side end wall; and
a rod packing interposed between an outer periphery of the rod and an inner periphery of the rod-side end wall,
wherein the rod packing is disposed in a recessed step portion provided in the inner periphery of the rod-side end wall, and includes a first lip having an edge for scraping off an oil film attached to the outer periphery of the rod, a second lip for sealing at a position closer to the distal end of the rod than the first lip, and a ring-shaped grease holding member holding grease to be supplied to the outer periphery of the rod, and the grease holding member is fitted in a ring-shaped recessed groove provided in an inner periphery of a portion of the rod packing fitted in the recessed step portion so as to be positioned between the first lip and the second lip and is in contact with the outer periphery of the rod at a position between the first lip and the second lip.

2. The shock absorber according to claim 1, wherein a sleeve surrounding the rod with a small slide gap therebetween extends from the rod-side end wall toward the piston chamber, and the rod includes, in a portion located in the slide gap between the outer periphery of the rod and the inner peripheries of the rod-side end wall and the sleeve, a labyrinth for reducing pressure acting on the rod packing via the oil in the slide gap.

3. The shock absorber according to claim 2, wherein the labyrinth includes a plurality of peripheral grooves surrounding the outer periphery of the rod, and the peripheral grooves are filled with a high-viscosity oil having a viscosity higher than a viscosity of the oil.

* * * * *